United States Patent [19]
Dauth et al.

[11] Patent Number: 6,043,362
[45] Date of Patent: Mar. 28, 2000

[54] HYDROPHILIC PERMANENT ORGANOSILICON COMPOUNDS

[75] Inventors: Jochen Dauth; Guenter Mahr; Bernward Deubzer, all of Burghausen; Petra Gratzl, Tuessling; Hans-Juergen Lautenschlager, Haiming, all of Germany

[73] Assignee: Wacker-Chemie GmbH, Munich, Germany

[21] Appl. No.: 08/888,557

[22] Filed: Jul. 7, 1997

[30] Foreign Application Priority Data

Jul. 11, 1996 [DE] Germany .......................... 196 28 018

[51] Int. Cl.$^7$ .................................................. C07D 47/00
[52] U.S. Cl. ........................ 544/215; 544/216; 8/94.1 R; 427/387
[58] Field of Search .................................... 544/215, 216; 8/84.1 R; 427/387

[56] References Cited

U.S. PATENT DOCUMENTS

| | | |
|---|---|---|
| 2,949,434 | 8/1960 | Bailey et al. . |
| 4,296,434 | 9/1981 | Lindner et al. . |
| 4,584,337 | 4/1986 | Lee et al. . |
| 5,089,567 | 2/1992 | Phanstiel et al. ........................ 525/397 |
| 5,159,096 | 10/1992 | Austin et al. . |
| 5,185,445 | 2/1993 | Meuwly et al. . |
| 5,393,859 | 2/1995 | Bernheim et al. . |

FOREIGN PATENT DOCUMENTS

| | | |
|---|---|---|
| 0470613 | 2/1952 | European Pat. Off. . |
| 9032370 | 8/1984 | European Pat. Off. . |
| 0 628 591 A2 | 12/1994 | European Pat. Off. . |
| 0628591 | 12/1994 | European Pat. Off. . |
| 1595789 | 2/1970 | Germany . |
| 3338663 | 5/1985 | Germany . |

OTHER PUBLICATIONS

Derwent Abstract Corresponding to OE 1555789 (# 68–01227Q100).
Derwent Abstract Corresponding to OE 3338663 (# 85–11753216).
Derwent Abstract Corresponding to EP 0628591 (# 95–015958103).

Primary Examiner—Paul F. Shaver
Attorney, Agent, or Firm—Brooks & Kushman P.C.

[57] ABSTRACT

The invention relates to oxyalkylene-group-containing organosilicon compounds having units of the formula

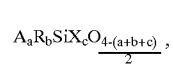 (I)

where R is identical or different, and denotes a monovalent halogenated or nonhalogenated hydrocarbon radical, X is identical or different and is a chlorine atom or a radical of the formula —OR$^1$, where R$^1$ denotes an alkyl radical which can be substituted by an ether oxygen atom, a is 0 or 1,
b is 0, 1, 2 or 3,
c is 0, 1, 2 or 3 and the total a+b+c≦4 and
A is a radical of the formula

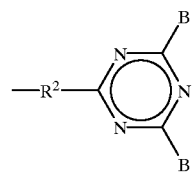 (II)

where R$^2$ signifies an unbranched or branched substituted or unsubstituted divalent hydrocarbon radical, which may or may not contain ether, amine, sulfide, ester, amide, carbonate, urea and urethane groups, B is identical or different, and denotes X, —NR$_2^1$, —O—C(=O)—R$^1$, —SR$^1$ or a radical of the formula

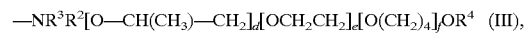

where X, R$^1$ and R$^2$ have the meanings given for these above, R$^3$ is identical or different and is a hydrogen atom or has the meaning of R, R$^4$ has the meaning of R$^3$ or signifies a radical of the formula

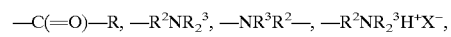

d, e and f are an integer from 0 to 200, with the proviso that the sum d+e+f≧1 and B contains at least one radical of the formula (III) per polymer molecule.

11 Claims, No Drawings

HYDROPHILIC PERMANENT ORGANOSILICON COMPOUNDS

BRIEF SUMMARY OF THE INVENTION

The present invention relates to oxyalkylene-group-containing organosilicon compounds, a process for their preparation and their use.

BACKGROUND OF THE INVENTION

Hydrophobic organopolysiloxanes containing substituted 1,3,5-triazine units are already known. For example, U.S. Pat. No. 2,949,434 (issued on Aug. 16, 1960, Bailey and Pike, UCC) describes a number of organopolysiloxanes containing dichlorotriazine units, synthesized by reacting amine-group-containing organopolysiloxanes with cyanuric chloride.

Hydrophobic organopolysiloxanes containing triazine units are disclosed in EP 628 591 A2 (laid open on May 28, 1994, Chrobaczek, Pfersee Chemie GmbH).

Siloxane/oxyalkylene copolymers are disclosed many times in the patent literature. Crosslinkable hydrophilic plasticizers are claimed for textile finishing, for example, in EP 470 613 A1 (published on Aug. 8, 1991, Czech, UCC) and EP 32310 (published on Dec. 22, 1980, Pines, UCC).

According to DE 33 38 663 C1 (filed on Oct. 25, 1983, Rott, Th. Goldschmidt AG), organosilicon compounds of the above mentioned structure are obtained for the textile fiber preparation.

A process for preparing siloxane/oxyalkylene copolymers is described in U.S. Pat. No. 5,159,096 (issued on Sep. 30, 1991, Austin, UCC). The use of silicone/organic copolymers in aqueous emulsion is described in U.S. Pat. No. 4,584,337 (issued on Dec. 18, 1984, Lee, Dow Corning).

DETAILED DESCRIPTION OF THE INVENTION

The object of the present invention is to provide hydrophilic organopolysiloxane/oxyalkylene copolymers which can be prepared in a simple process using readily accessible starting materials, are fungicidal, are self-emulsifiable or are water-soluble and whose hydrophilicity, emulsifiability or water-solubility can be controlled in a specific manner by modifying the polymer structures and polymer chain lengths. Optionally, the copolymers according to the invention are to be made reactive or crosslinkable.

The present invention relates to oxyalkylene-group-containing organosilicon compounds containing units of the formula

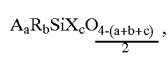
(I)

where
R is identical or different, and denotes a monovalent optionally halogenated hydrocarbon radical having 1 to 18 carbon atom(s) per radical,
X is identical or different and is a chlorine atom or a radical of the formula —$OR^1$, where
$R^1$ denotes an alkyl radical having 1 to 8 carbon atom(s) per radical which is optionally substituted by an ether oxygen atom,
a is 0 or 1,
b is 0, 1, 2 or 3,
c is 0, 1, 2 or 3 and the total $a+b+c \leq 4$ and
A is a radical of the formula

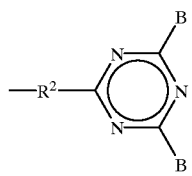
(II)

where
$R^2$ signifies an unbranched or branched optionally substituted divalent hydrocarbon radical having 1 to 18 carbon atom(s), optionally substituted with an ether, amine, sulfide, ester, amide, carbonate, urea or urethane group,
B is identical or different, and denotes X, —$NR_2^1$, —O—C(O)—$R^1$, —$SR^1$ or a radical of the formula

(III)

where
X, $R^1$ and $R^2$ have the meanings given above,
$R^3$ is identical or different and is a hydrogen atom or has the meaning of R, $R^4$ has the meaning of $R^3$ or signifies a radical of the formula

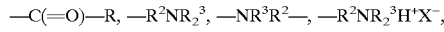

d, e and f are integers of preferably 0–200, with the proviso that the sum $d+e+f \geq 1$ and at least one B containing at least one radical of formula (III) is present per organosilicon compound. The organopolysiloxane/oxyalkylene copolymers according to the invention can be crosslinked via the oxyalkylene groups.

The present invention further relates to a process for preparing oxyalkylene-group-containing organosilicon compounds, which comprises reacting organosilicon compounds containing units of the formula

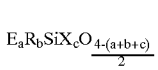
(IV)

where R, X, a, b and c have the meaning specified above and E is a radical of the formula

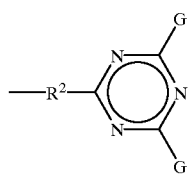
(V)

where $R^2$ has the meaning specified above and
G is identical or different and denotes a chlorine atom, —$OR^1$, —$SR^1$, —$NR_2^1$ or —O—C(O)$R^1$,
with the proviso that at least one chlorine atom is present per organosilicon compound molecule, with an amine-functionalized polyoxyalkylene of the formula

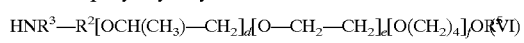
(VI)

where $R^2, R^3$, d, e and f have the meaning specified above, $R^5$ has the meaning of $R^3$ or signifies a radical of the formula —C(=O)—R, or —$R^2R_2^3$N, optionally in the presence of bases in organic solvents, in water or in mixtures of the two.

The organosilicon compounds according to the invention have a mean molecular weight of 500 to 1,000,000 g/mol, preferably 5,000 to 150,000 g/mol and have a viscosity of 10 to 1,000,000 mm$^2$*s$^{-1}$ at 25° C., preferably 20 to 100,000 mm$^2$*s$^{-1}$ at 25° C.

Examples of radicals R are alkyls, such as methyl, ethyl, n-propyl, isopropyl, 1-n-butyl, 2-n-butyl, isobutyl, tert-butyl, n-pentyl, isopentyl, neopentyl, tert-pentyl; hexyl radicals, such as n-hexyl; heptyl radicals, such as n-heptyl; octyl radicals, such as n-octyl and isooctyl radicals such as 2,2,4-trimethylpentyl; nonyl radicals, such as n-nonyl; decyl radicals, such as n-decyl; dodecyl radicals, such as n-dodecyl; octadecyl radicals, such as n-octadecyl; cycloalkyl radicals, such as cyclopentyl, cyclohexyl, cyclo-heptyl and methylcyclohexyls; aryl radicals, such as phenyl, naphthyl, anthryl and phenanthryl; alkaryl radicals, such as o-, m-, p-tolyl radicals; xylyl radicals and ethylphenyl radicals; cals; and aralkyl radicals, such as benzyl, α- and β-phenylethyl. Preference is given to the methyl radical.

Examples of halogenated radicals R are haloalkyl radicals, such as 3,3,3-trifluoro-n-propyl, 2,2,2,2',2',2'-hexafluoroisopropyl, heptafluoroisopropyl and haloaryl radicals, such as o-, m- and p-chlorophenyl.

Examples of alkyl radicals $R^1$ are methyl, ethyl, n-propyl, isopropyl, 1-n-butyl, 2-n-butyl, isobutyl and tert-butyl. Preference is given to the methyl and ethyl radicals. Examples of alkyl radicals $R^1$ which are substituted by an ether oxygen atom are methoxyethyl and ethoxyethyl.

Examples of radicals $R^2$ are alkyl radicals of the formulae —CH$_2$—CH$_2$—, —CH$_2$—CH$_2$—CH$_2$—, —CH$_2$—CH(CH$_3$)—, —CH$_2$—CH(CH$_3$)—CH$_2$— and substituted alkyl radicals of the formulae

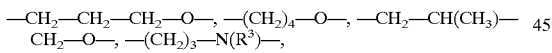

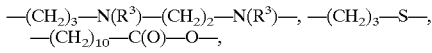

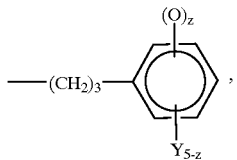

where $R^3$ has the meaning above,

Y is identical or different, and denotes a hydrogen atom, an unbranched or branched alkyl radical preferably having 1 to 6 carbon atom(s) per radical, a radical of the formula —OR$^1$ or denotes —X, where X and $R^1$ have the meaning specified above and z is an integer from 1 to 5.

Preferably, the radical $R^3$ is a hydrogen atom, a methyl group or a cyclohexyl group.

Preferred radicals for $R^2$ are those of the formula

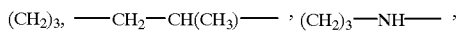

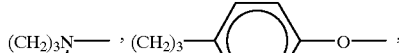

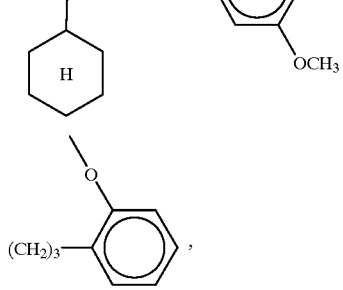

a preferred radical for B is a chlorine atom or radicals of the formulae

—NH—CH(CH$_3$)—CH$_2$(OCH$_2$CH$_2$)$_e$OCH$_2$—CH(CH$_3$)—NH$_3^+$ Cl$^-$,

—N—CH(CH$_3$)—CH$_2$(OCH (CH$_3$)—CH$_2$)$_e$OCH$_2$—CH(CH$_3$)— NH$_3^+$Cl$^-$,

—NH—CH(CH$_3$)—CH$_2$—(OCH$_2$CH$_2$)$_e$OCH$_2$—CH(CH$_3$)—NH—,

—NH—CH(CH$_3$)—CH$_2$—(OCH(CH$_3$)—CH$_2$)$_e$OCH$_2$— CH(CH$_3$)—NH—,

—NH—CH(CH$_3$)—CH$_2$(OCHR$_3$CH$_2$)$_e$OCH$_3$,

—NH (CH$_2$)$_3$(OCH$_2$CH$_2$)$_e$O—CH$_3$, or

—NH (CH$_2$)$_3$(OCH(CH$_3$)—CH$_2$)$_e$OCH$_3$.

where e is preferably 2, 3, 12, 18 or 44.

In formula (I) and (IV), c is preferably 0. In formula (I) and (II), a averages 0.001 to 1.0, preferably 0.01 to 0.5, b averages 0.0 to 3.0, preferably 0.2 to 2.5, c averages 0.3 to 3.0, preferably 0 to 2 and the sum a+b+c averages 0.1 to 4.0, preferably 0.2 to 3.5.

Preferred oxyalkylene group-containing organosilicon compounds are those of the formula $$A_gR_{3-g}SiO(SiR_2O)_n(SiRAO)_mSiR_{3-g}A_g \qquad (VII),$$

where A and R have the meaning specified above, g is 0, 1 or 2, n is 0 or an integer from 1 to 1500, preferably 5 to 1000 and m is 0 or an integer from 1 to 200, preferably 1 to 100, with the proviso that at least one radical A is present per molecule.

The organosilicon compounds used in the process according to the invention are organopolysiloxanes. Preferably, those of the formula $$E_gR_{3-g}SiO(SiR_2O)_n(SiRBO)_mSiR_{3-g}E_g \qquad (IVa),$$

where E, R, g, n and m have the meaning specified above, are used in the processes according to the invention.

Preferred radicals for E are those of the formula

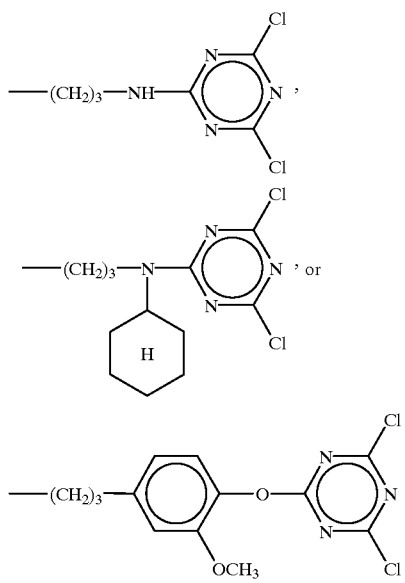

Examples of bases which are used in the process according to the invention are amines, such as triethylamine, triisooctylamine, pyridine, diethylamine and piperazine, and inorganic bases, such as potassium hydroxide, sodium hydroxide, cesium hydroxide, calcium hydroxide, sodium carbonate, sodium hydrogen carbonate and sodium methoxide.

In the process according to the invention, 0.01–6 mole of amino group of the polyoxyalkylenes of formula (VI), preferably 0.1–4 mole of amino group, and more preferably 0.5–2 mole of amino group, are used per mole of chlorine group in the radical E of the organosilicon compound (IV). The aminehydrochlorides or salts formed in the process according to the invention are removed by filtration.

The bases are used in amounts such that 0 to 2 mole, preferably 0 to 1 mole, is present per mole of chlorine group in the radical E of the organosilicon compound.

In the process according to the invention, inert organic solvents can be used. Examples of inert organic solvents are toluene, xylene, THF, butyl acetate and dimethoxyethane.

In the process according to the invention, a reaction of the organosilicon compounds of formula (IV) containing groups of the formula E with aminofunctionalized polyoxyalkylenes of formula (VI) in solvent is preferred, since in water, with self-emulsification of the copolymers according to the invention, although a formulation suitable for applications is formed, the reactive cyanuric chloride groups hydrolyze rapidly.

The processes according to the invention are carried out at the pressure of the ambient atmosphere at about 1020 hPa (absolute). However, they can also be carried out at higher or lower pressures. Furthermore, the processes according to the invention are carried out at a temperature of 25° C. to 150° C., preferably 25° C. to 120° C., more preferably 25° C. to 60° C.

The synthesis of the intermediate of the organosilicon con compounds containing triazine groups (groups of formula E) of formula (IV) involves reacting, organosilicon compounds containing units of the formula $$D_aR_bX_cSiO_{(4-a-b-c)/2}, \quad (VIII)$$

where
D is a radical of the formula

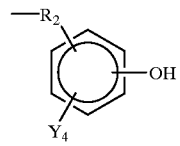

and R, $R^2$, X, Y, a, b and c have the specified meaning, with optionally substituted cyanuric halide, preferably cyanuric chloride, using bases.

The bases used are amines, such as triethylamine, triisooctylamine, pyridine, diethylamine, piperazine and inorganic bases, such as potassium hydroxide, sodium hydroxide, cesium hydroxide, calcium hydroxide, sodium carbonate and sodium hydrogen carbonate and also sodium methoxide.

To synthesize the precursor (VIII) and the preferred precursors containing units of the formula $$D_dR_{3-d}SiO(SiR_2O)_e(SiRBO)_fSiR_{3-d}D_d \quad (X),$$

where D, R, d, e and f have the meaning specified above, with the proviso that at least one radical D is present per polymer molecule, by means of a hydrosilylation reaction, use is made of organosilicon compounds containing at least one Si-bonded hydrogen atom per organopolysiloxane of the formula $$H_iR_hX_jSiO_{(4-i-h)/2} \quad (XI),$$

where R has the meaning specified above,
i is 0 or 1, preferably 0.01 to 0.5,
h is 0, 1, 2 or 3, preferably 0.2 to 2.5, and the sum i+h is not greater than 3,
j is 0, 1, 2 or 3, preferably 0.0–2.0.

The precursors (VIII) and (X) are disclosed, e.g. by DE-A 1 595 789 (laid open Feb. 12, 1970, Krantz, General Electric Co.).

The organopolysiloxanes containing at least one Si-bonded hydrogen atom contain at least 0.02% by weight, preferably 0.05 to 1.65% by weight, of Si-bonded hydrogen, and their mean viscosity is 5 to 20,000 mm²/s at 25° C., preferably 10 to 2000 mm²/s at 25° C., more preferably 10 to 1000 mm²/s at 25° C.

Preferably, the organopolysiloxanes having at least one Si-bonded hydrogen atom per molecule used are those of the formula $$H_kR_{3-k}SiO(SiR_2O)_l(SiRHO)_pSiR_{3-k}H_k \quad (XII),$$

where R has the meaning specified above and
k is 0 or 1,
l is 0 or an integer from 1 to 1,500, preferably 5 to 1000, and
p is 0 or an integer from 1 to 200, preferably 1 to 100.

Processes for preparing organopolysiloxanes containing at least one Si-bonded hydrogen atom per molecule of formula (XII), even those of the preferred type, are generally known.

Preferentially, to prepare formula VIII, use is made of hydroxyaryl components of the formula

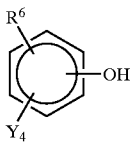

where
R⁶ denotes an unbranched or branched, substituted or unsubstituted alkenyl radical, having 1 to 18, prefearbly 1 to 12, hydrocarbon atom(s), which compounds are disclosed by DE-A 1 595 789.

Examples of $R^6$ are $CH_2=CH-$, $CH_2=CHCH_2-$, $CH_2=C(CH_3)-$, $CH_2=C(CH_3)CH_2-$, $CH_2=CH(CH_2)_9-$ and substituted alkenyl radicals of the formula $CH_2=CHCH_2O-$, $CH_2=CHCH_2OC(O)-$, $CH_2=CHCH_2NH-$, $CH_2=C(CH_3)CH_2O-$, $CH_2=C(CH_3)CH_2OC(O)-$, $CH_2=C(CH_3)CH_2NH-$, $CH_2=CHCH_2S-$ and $CH_2=CHCH_2NHC(O)-$.

A preferred hydroxyaryl component (Xa) for preparing the precursor (VIII) by a hydrosilylation reaction is commercially available from Haarmann & Reimer, for example, under the name Eugenol (4-allyl-2-methoxyphenol) and, in comparison with unsaturated alcohols, such as 3-buten-1-ol, has a lower volatility, a higher flashpoint, a higher acid strength and a lower toxicity. Eugenol is even approved for the food sector.

Unsaturated hydroxyaryl compounds are preferably used in the hydrosilylation reaction in amounts such that 1 to 2 mole, preferably 1.05 to 1.50 mole, of organic compound is present per gram atom of Si-bonded hydrogen in the organosilicon compound (X).

As catalysts promoting the addition of Si-bonded hydrogen to an aliphatic multiple bond, use can also be made in the process of the same catalysts which have previously been used to promote the addition of Si-bonded hydrogen to aliphatic multiple bonds. The catalysts are preferably a metal selected from the group consisting of the platinum metals or a compound or a complex of a metal selected from the group consisting of the platinum metals.

Examples of catalysts of this type are preferably metallic and finely divided platinum, which may be situated on supports such as silicon dioxide, aluminum oxide or activated carbon, compounds or complexes of platinum, such as platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes including products of reaction between $H_2PtCl_6 \cdot 6H_2O$ and cyclohexanone, platinum-vinylsiloxane complexes, such as platinum-1,3-divinyl-1,1,3,3-tetra-methyldisiloxane complexes with or without a detectable content of inorganically bound halogen, bis-(γ-picoline)-platinum dichloride, trimethylenedipyridineplatinum dichloride, dicyclopentadieneplatinum dichloride, (dimethylsulfoxide)ethyleneplatinum(II) dichloride, cyclooctadieneplatinum dichloride, norbornadieneplatinum dichloride, γ-picolineplatinum dichloride, cyclopentadieneplatium dichloride and reaction products of platinum tetrachloride with olefin and primary amine or secondary amine or primary and secondary amine according to U.S. Pat. No. 4,292,434, such as the reaction product of platinum tetrachloride, dissolved in 1-octene, with $[Rh(Cl)\{p(C_6H_5)\}_3]$-sec-butyl-amine, or ammonium-platinum complexes according to EP-B 1 10 370; preference is given to hexachloroplatinic acid, platinum-olefin complex, platinum-vinylsiloxane complex and the platinum-1,3-divinyl-1,1,3,3-tetramethyl-disiloxane complex.

The catalyst is used in amounts of 2 to 200 ppm by weight (parts by weight per million parts by weight), preferably in amounts of 5 to 50 ppm by weight, in each case calculated as elemental platinum and based on the total weight of organic compound and organosilicon compound.

The process is carried out at the pressure of the ambient atmosphere, at about 1020 hPa (absolute), but it can also be carried out at higher or lower pressures. Furthermore, the process according to the invention is carried out at a temperature of 30° C. to 150° C., preferably 50° C. to 120° C.

In the process, inert organic solvents can be used, although the use of inert organic solvents is not preferred. Examples of inert organic solvents are toluene, xylene, isophorone, octane isomers, butyl acetate, isopropanol and dimethoxyethane.

Excess organic compound and any inert organic solvent used are removed by distillation from the hydroxyaryl-group-containing organosilicon compounds prepared by the process.

In the process, substituted or unsubstituted cyanuric halide of the formula

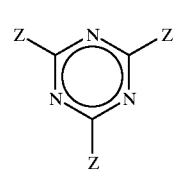

(XIII)

is esterified with the described precursors of formula (VIII) or the preferred precursors of formula (X), with addition of base, where Z is a chlorine radical or a methoxy radical.

In the process, 0.5 mole to 6 mole of substituted or unsubstituted cyanuric halide of formula (XIII), preferably 0.5 mole to 3 mole of substituted or unsubstituted cyanuric chloride, and more preferred 1 mole to 2 mole of substituted or unsubstituted cyanuric chloride, are used per mole of hydroxyl group. The amine hydrochlorides or salts which may be produced in the process according to the invention are removed by filtration, acidic, basic or neutral filter aids being able to be used in the filtration.

The process is carried out at the pressure of the ambient atmosphere, at about 1020 hPa (absolute), but it can also be carried out at higher or lower pressures. Furthermore, the process according to the invention is carried out at a temperature of −20° C. to 120° C., preferably −10° C. to 100° C.

In the process, inert organic solvent can be used the use of polar organic solvents being preferred. Examples of inert organic solvents are toluene, xylene, isophorone, octane isomers, butyl acetate, isopropanol, dimethylethylene glycol, tetrahydrofuran and dioxane.

The triazine-group-containing organosilicon compounds obtained by the process can also contain non-esterified hydroxyaryl groups.

Furthermore, in the process, non-esterified hydroxyl groups of the organosilicon compounds (VIII) or (X) can be further reacted, by carboxylating agents such as acetic anhydride, diketene and dihydropyran.

Excess organic compound (XIII) is removed by sublimation or by filtration from the triazine-group-containing organosilicon compounds prepared by the process, and excess carboxylating agent and any inert organic solvent which may have been used is removed by distillation. The description of the process for preparing the intermediate is thus completed.

The polyoxyalkylene-containing organopolysiloxanes obtained by the process according to the invention can be equilibrated with organopolysiloxanes selected from the group consisting of unbranched terminal-triorganosiloxy-group-containing organopolysiloxanes, unbranched terminal-hydroxyl-group-containing organopolysiloxanes, cyclic organopolysiloxanes and mixed polymers of diorganosiloxane and monoorganosiloxane units.

The linear terminal-triorganosiloxy-group-containing organopolysiloxanes used are those of the formula $R_3SiO(SiR_2O)_rSiR_3$, where R has the meaning specified above and r is preferentially 0 or an integer from 1 to 1500, preferably 10 to 1000, the linear terminal-hydroxyl-group-containing organopolysiloxanes used are those of the formula $HO(SiR_2O)_sH$, where R has the meaning specified above and s is preferentially an integer from 1 to 1500, preferably 10 to 1000, the cyclic organopolysiloxanes used are those of the formula $(R_2SiO)_t$, where R has the meaning specified above and t is preferentially an integer from 3 to 12, preferably 3 to 5, and the mixed polymers used are those of units of the formula $R_2SiO$ and $RSiO_{3/2}$, where R has the meaning specified above.

The ratios of the oxyalkylene-group-containing organopolysiloxanes and organopolysiloxanes used in the optional equilibration step are determined solely by the desired proportion of oxyalkylene groups in the organopolysiloxanes produced and by the desired mean chain length.

In the optional equilibration, acid catalysts which promote the equilibration are used. Examples of catalysts of this type are sulfuric acid, phosphoric acid, tri-fluoromethanesulfonic acid, phosphonitrilic chlorides and acidic catalysts which are solid under the reaction conditions, such as acid-activated bleaching earth, acid zeolites, sulfonated coal and sulfonated styrene/divinyl-benzene mixed polymer. Preference is given to phosphonitrilic chlorides. Phosphonitrilic chlorides are used in amounts of 5 to 1000 ppm by weight, in particular 50 to 200 ppm by weight, in each case based on the total weight of the organosilicon compounds used. Although the use of basic equilibration catalysts is possible, it is not preferred.

The equilibration is carried out at 80° C. to 150° C., preferably 120° C. and at the pressure of the ambient atmosphere, at about 1020 hPa (absolute). However, optionally, higher or lower pressures can also be used. The equilibration is carried out in a water-immiscible solvent, such as toluene, in 5% to 20% by weight, preferably 10% to 20% by weight, based on the total weight of the particular organosilicon compound used.

Before the mixture obtained in the equilibration is worked up, the catalyst can be inactivated.

The processes according to the invention can be carried out batchwise, semicontinuously or completely continuously.

The polyoxyalkylene-group-containing organosilicon compounds according to the invention are distinguished by their simple route of synthesis and the possibility of specifically grading their hydrophilicity. In addition to a possible permanent finish, the copolymers according to the invention have a good hydrophobic permanent soft feel with, at the same time, good water absorbency and a low tendency to yellowing, permanent meaning in this context that the properties achieved using the substances according to the invention are retained even after repeated washing.

Said copolymers according to the invention serve for treating textile fabrics, such as woven fabrics, knitted goods or nonwovens. The permanence of the effects with respect to washing processes is excellent, in particular in the case of textiles which comprise or consist of cellulose fibers or polyamide fibers. The invention further relates to textile fiber preparations and leather treatment.

EXAMPLE 1

20.0 g of a cyanuric-chloride-containing silicone oil of the form M—$D_{100}$—M where D=$Si(CH_3)_2O$ and M=$Si(CH_2)_3$—$C_6H_3$(m-OMe)—p—O—$C_3N_3Cl_2$ having a chlorine content of 1.7% by weight, and which is described in Example 14, are introduced into 40 g (0.43 mole) of toluene with stirring at room temperature. To this is added slowly dropwise a mixture of 5.68 g (9.6 mmol) of O-(2-amino-propyl)-O'-(methoxyethyl)polypropylene glycol having a mean chain length of 8.1 repeating units (amine value=1.69 mole/g) and 2.13 g of a 25% strength by weight solution of potassium hydroxide in methanol (9.5 mmol of KOH).

The reaction solution is then stirred for a further 30 minutes at 80° C., filtered and concentrated to constant weight under high vacuum. After a repeated filtration, 23.37 g (91% of theory) of a clear, yellow oil of viscosity 603 mm²/s having a chlorine content of <0.05% by weight are obtained.

EXAMPLE 2

20.0 g of a cyanuric-chloride-containing silicone oil of the form M—$D_{100}$—M where D=$Si(CH_3)_2O$ and M=$Si(CH_2)_3$—$C_6H_3$(m-OMe)—p—O—$C_3N_3Cl_2$ having a chlorine content of 1.7% by weight, are introduced into 40 g (0.43 mol) of toluene with stirring at room temperature.

To this is added slowly dropwise a mixture of 2.84 g (4.8 mmol) of O-(2-aminopropyl)-O'-(methoxyethyl) polypropylene glycol having a mean chain length of 8.1 repeating units (amine value=1.69 mmol/g) and 1.07 g of a 25% strength by weight solution of potassium hydroxide in methanol (4.75 mmol of KOH).

The reaction solution is then stirred for a further 30 minutes at 80° C., filtered and concentrated to constant weight under high vacuum. After a repeated filtration, 21.73 g (95.1% of theory) of a clear yellow oil of viscosity cosity 4300 mm²/s having a chlorine content of 0.22% by weight are obtained.

EXAMPLE 3

20 g of a cyanuric-chloride-containing cyclohexyl-aminesilicone oil of the form $MD_xD_yM$ where M=$O_{1/2}Si(CH_3)_3$, $D_x$=$Si(CH_3)_2O$ and $D_y$=$Si(CH_2)_3N(C_6H_{11})C_3N_3Cl_2$, having a chlorine content of 2.9% by weight, and which is described in Example 16, are introduced into 40 g (0.43 mole) of toluene at room temperature with stirring.

To this is added slowly dropwise a mixture of 9.68 g (16.4 mmol) of O-(2-aminopropyl)-O'-(methoxyethyl)

polypropylene glycol having a mean chain length of 8.1 repeating units (amine value=1.69 mmol/g) and 3.64 g of a 25% strength solution of potassium hydroxide in methanol (16.2 mmol of KOH).

The reaction solution is then stirred for 30 minutes at 80° C., filtered and concentrated to constant weight under high vacuum. After a repeated filtration, 25.39 g (85.6% of theory) of a transluscent colorless oil of viscosity 1050 mm²/s having a chlorine content of 1.0% by weight are obtained.

EXAMPLE 4

20 g of a cyanuric-chloride-containing cyclohexyl-aminesilicone oil of the structure described in Example 3 and having a chlorine content of 2.9% by weight are introduced into 40 g (0.43 mmol) of toluene at room temperature with stirring.

To this is added slowly dropwise a mixture of 4.84 g (8.2 mmol) of O-(2-aminopropyl)-O'-(methoxyethyl) polypropylene glycol having a mean chain length of 8.1 repeating units (amine value=1.69 mmol/g) and 1.8 g of a 25% strength by weight solution of potassium hydroxide in methanol (8.0 mmol of KOH).

The reaction solution is then stirred at 80° C. for 30 minutes, filtered and concentrated to constant weight under high vacuum. After a repeated filtration, 22.84 g (91.9% of theory) of a slightly turbid colorless oil of viscosity 590 mm²/s having a chlorine content of 0.24% by weight are obtained.

EXAMPLE 5

20 g of a cyanuric-chloride-containing silicone oil of the form $MD_xD_yM$ where $M=O_{1/2}Si(CH_3)_3$, $D_x=Si(CH_3)_2O$ and $D_y=Si(CH_2)_3C_6H_3(mOMe)—p—OC_3N_3Cl_2$ and having a chlorine content of 1.1% by weight are introduced into 40 g (0.43 mol) of toluene at room temperature with stirring.

To this is added slowly dropwise a mixture of 3.67 g (6.2 mmol) of O-(2-aminopropyl)-O'-(methoxyethyl) polypropylene glycol having a mean chain length of 8.1 repeating units (amine value=1.69 mmol/g) and 1.38 g of a 25% strength by weight solution of potassium hydroxide in methanol (6.1 mmol of KOH).

The reaction solution is then stirred for a further 30 minutes at 80° C., filtered and concentrated to constant weight under high vacuum. After a repeated filtration, 20.59 g (87% of theory) of a slightly turbid yellow oil of viscosity 4850 mm²/s having a chlorine content of 0.53% by weight are obtained.

EXAMPLE 6

The procedure of Example 5 was repeated, except that instead of 3.67 g, 1.84 g of O-(2-aminopropyl)-O'-(methoxyethyl) polypropylene glycol was used and, instead of 1.38 g, 0.69 g of the 25% strength by weight solution of potassium hydroxide in methanol was used. 21.24 g (97.3% of theory) of a clear yellow oil of viscosity 820 mm²/s having a chlorine content of 0.8% by weight were obtained.

EXAMPLE 7

20 g of a cyanuric-chloride-containing silicone oil of the form described in Example 1 and 0.4 g (4.75 mol) of sodium hydrogen carbonate are introduced into 40 g (0.43 mole) of toluene at room temperature with stirring. To this are added slowly dropwise 3.02 g (4.8 mmol) of O-(2-aminopropyl)-O'-(methoxyethyl)polyethylene glycol having a mean chain length of 13 repeating units (amine value=1.59 mmol/g). The reaction mixture is then stirred for a further 30 minutes at 80° C., filtered and concentrated to constant weight under high vacuum. 21.67 g (94.1% of theory) of a clear yellow oil of viscosity 24,800 mm²/s having a chlorine content of 0.68% by weight are obtained.

EXAMPLE 8

7.0 g (5.25 mmol) of O,O'-bis(-2-aminopropyl) polyethylene glycol having a mean chain length of 48 repeating units (amine value=0.75 mmol/g) are dissolved in 37.4 g (2.08 mol) of distilled water at room temperature.

The aqueous liquor is then sheared using a Turrax disperser (13,000 rpm). To this are added slowly 5.47 g of a cyanuric-chloride-containing silicone oil of the form described in Example 1.

The mixture is then stirred for a further hour using a magnetic stirrer. A stable emulsion having a solids content of 25% by weight is obtained.

EXAMPLE 9

8.0 g (17.3 mmol) of O,O'-bis(-2-aminopropyl) polyethylene glycol having a mean chain length of 18 repeating units (amine value=2.16 mmol/g) are dissolved in 42.02 g (2.33 mole) of distilled water at room temperature.

The aqueous liquor is then sheared using a Turrax disperser (13,000 rpm). To this are added slowly 6.01 g of a cyanuric-chloride-containing silicone oil of the form described in Example 1.

The mixture is then stirred for a further hour using a magnetic stirrer. A stable emulsion having a solids content of 25% by weight is obtained.

EXAMPLE 10

The procedure of Example 8 was repeated, except that instead of 7.0 g, 7.5 g of O,O'-bis(-2-aminopropyl) polyethylene glycol having a mean chain length of 45 repeating units were used, instead of 37.4 g, 29.18 g of distilled water were used, and instead of 5.47 g of the cyanuric-chloride-containing silicone oil described in Example 1, 2.23 g of the cyanuric-chloride-containing silicone oil described in Example 3 were used. An emulsion which creams slightly after 3 days and has a solids content of 25% by weight is obtained.

EXAMPLE 11

The procedure of Example 8 was repeated, except that, instead of 37.4 g, 46.4 g of distilled water were used and, instead of 5.47 g of the cyanuric-chloride-containing silicone oil described in Example 1, 8.46 g of the cyanuric-chloride-containing silicone oil described in Example 5 were used. A stable emulsion having a solids content of 25% by weight was obtained.

EXAMPLE 12

4.0 g (8.64 mmol) of O,O'-bis(-2-aminopropyl) polyethylene glycol having a mean chain length of 18 repeating units (amine value=2.16 mmol/g) are dissolved in 53.76 g (2.98 mole) of distilled water at room temperature.

The aqueous liquor is then sheared using a Turrax disperser (13,000 rpm). To this are added slowly dropwise 13.92 g of a cyanuric-chloride-containing silicone oil described in Example 5. The mixture is then stirred for a

13 further hour using a magnetic stirrer. A stable emulsion having a solids content of 25% by weight is obtained.

EXAMPLE 13

A mixture of 108.4 g (0.660 mole) of Eugenol, 2000 g (0.600 mole of SiH) of a α,ω-hydrogen-polydimethylsiloxane of viscosity 170 mm²/s and 7.026 ml (10 ppm of platinum) of a 1% strength solution of hexachloroplatinic acid in isopropanol was heated to 30° C. under an inert nitrogen atmosphere. After completion of the exothermic reaction, the reaction mixture was stirred for 2 hours at a temperature of 50° C. Volatile constituents were then removed at 120° C. and a reduced pressure of approximately 5 mbar. After cooling and subsequent filtration, a brownish clear oil having a viscosity of 200 mm²/s and a hydroxyl value of 17.06 mg of KOH/g was obtained. Yield: 93.0% (of theory) (precursor II)

EXAMPLE 14

A mixture of 1000 g (0.304 mole of hydroxyl groups) of precursor II, 52.0 g of a 30% strength solution of NaOCH₃ in MeOH (0.289 mol of NaOCH₃) and 105.2 g of dimethoxyethane was stirred for 1 hour at a temperature of 25° C. and then for 1 hour at a temperature of 60° C., under a nitrogen stream. The majority of the methanol was removed in a mixture with dimethoxyethane by distillation in the course of this. After addition of another 105.2 g of dimethoxyethane, this mixture was added in the course of 1.5 hours to a solution of 56.1 g (0.304 mole) of cyanuric chloride in 224.4 g of dimethoxyethane. The reaction mixture was then stirred for 1 hour at a temperature of 60° C. and then stirred for 2 hours with cooling. All volatile constituents were then removed at a temperature of 140° C. and a reduced pressure of approximately 5 mbar. After final filtration, a faintly green, slightly turbid oil having a viscosity of 271 mm²/s was obtained. Yield: 79.8% (of theory).

EXAMPLE 15

A solution of 346.9 g (2.113 mole) of Eugenol in 409.9 g of isopropanol was admixed with 8.25 g (0.078 mole) of sodium carbonate and heated to 80° C. under an inert nitrogen atmosphere. At this temperature, 13.013 ml (10 ppm of platinum) were added to a 1% strength solution of hexachloroplatinic acid in isopropanol. 3750 g (1.838 mole of SiH) of a polydimethylsiloxane of viscosity 69 mm²/s having side-chain hydrogen groups were then added in the course of 65 minutes and the reaction mixture was stirred for 1 hour at a temperature of 90° C. Volatile constituents were then removed at 120° C. and a reduced pressure of approximately 5 mbar. After filtration and subsequent short-path distillation, a brownish clear oil having a viscosity of 309 mm²/s and a hydroxyl value of 20.55 mg of KOH/g was obtained. Yield: 79.7% (of theory) (precursor III).

EXAMPLE 16

A mixture of 250 g (0.092 mole of hydroxyl groups) of precursor III, 15.6 g of a 30% strength solution of NaOCH₃ in MeOH (0.087 mole of NaOCH₃) and 26.6 g of dimethoxyethane was stirred for 1 hour at a temperature of 25° C. and was then stirred for 1 hour at a temperature of 60° C., under a nitrogen stream. The majority of the methanol was removed in a mixture with dimethoxyethane by distillation in the course of this. After addition of another 26.6 g of dimethoxyethane, this mixture was added to a solution of 16.9 g (0.092 mole) of cyanuric chloride in 67.7 g of dimethoxyethane in the course of 0.4 hours. The reaction mixture was then stirred for 1 hour at a temperature of 60° C. and was then stirred for 2 hours with cooling. All volatile constituents were then removed at a temperature of 140° C. and a reduced pressure of approximately 5 mbar. After final filtration, a faintly green clear oil having a viscosity of 278 mm²/s was obtained. Yield: 85.8% (of theory).

What is claimed is:

1. An oxyalkylene-group-containing organosilicon compound containing units of the formula

where R is identical or different, and denotes a monovalent halogenated or nonhalogenated hydrocarbon radical, X is identical or different and is a chlorine atom or a radical of the formula —OR¹, where R¹ denotes an alkyl radical which can be substituted by an ether oxygen atom, a is 0 or 1, b is 0, 1, 2 or 3, c is 0, 1, 2 or 3 and the total a+b+c≦4 and A is a radical of the formula

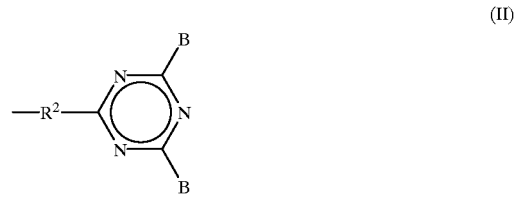

where R² signifies an unbranched or branched substituted or unsubstituted divalent hydrocarbon radical, optionally containing ether, amine, sulfide, ester, amide, carbonate, urea and urethane groups, B is identical or different, and denotes X, —NR₂¹, —O—C(=O)—R¹, —SR¹ or a radical of the formula

where X, R¹ and R² have the meanings given for these above, R³ is identical or different and is a hydrogen atom or has the meaning of R, R⁴ has the meaning of R³ or signifies a radical of the formula

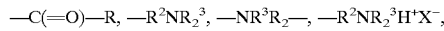

d, e and f are integers from 0 to 200, with the proviso that the sum d+e+f≧1 and B contains at least one radical A bearing at least one radical of the formula (III) per polymer molecule.

2. The oxyalkylene-group-containing organosilicon compound as claimed in claim 1, wherein B is a chlorine atom or a radical of the formulae:

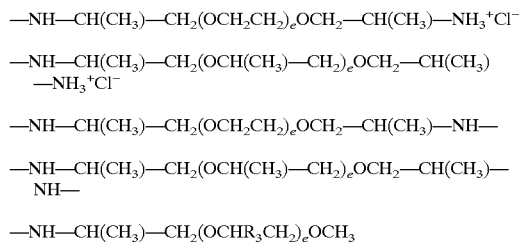

—NH—(CH$_2$)$_3$(OCH$_2$CH)$_e$O—CH$_3$, or

—NH—(CH$_2$)$_3$(OCH(CH$_3$)—CH$_2$)$_e$OCH$_3$ where e is 2, 3, 12, 18 and 44.

3. The oxyalkylene-group-containing organosilicon compound as claimed in claim 1, of the formula $$A_gR_{3-g}SiO(SiR_2O)_n(SiRAO)_mSiR_{3-g}A_g \quad (VII),$$

where g is 0, 1 or 2, n is 0 or an integer from 1 to 1500 and m is 0 or an integer from 1 to 200, with the proviso that at least one radical A is present per molecule.

4. A process for preparing an oxyalkylene-group-containing organosilicon compounds as claimed in claim 3, said process comprising reacting organosilicon compounds containing units of the formula $$E_aR_bSiX_cO_{\frac{4-(a+b+c)}{2}}, \quad (VII)$$

where R, X, a, b and c have the meaning specified therefor above and E is a radical of the formula

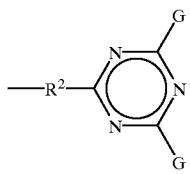

(V)

where R$^2$ has the meaning specified therefor above and G denotes a chlorine atom, —OR$^1$, —SR$^1$, —NR$_2^1$ or —O—C(O)R$^1$, with the provisio that at least one chlorine atom is present per polymer molecule, with an amine-functionalized polyoxyalkylene of the formula HNR$^3$—R$^2$[OCR(CH$_3$)—CH$_2$]$_d$[O—CH$_2$—CH$_2$]$_e$[O(CH$_2$)$_4$]$_f$OR$^5$(VI)

where R$^2$, R$^3$, d, e and f have the meaning specified therefor above, R$^5$ has the meaning of R$^3$ or signifies a radical of the formula

—C(=O)—R, —R$^2$R$_2^3$N, in organic solvents, in water or in mixtures of water and at least one organic solvent, optionally in the presence of a base.

5. A process for preparing oxyalkylene-group-containing organosilicon compounds as claimed in claim 4, wherein the organosilicon compounds (IV) are organopolysiloxanes of the formula $$E_gR_{3-g}SiO(SiR_2O)_n(SiRBO)_mSiR_{3-g}E_g \quad (IVa),$$

where E, R, g, n and m have the meaning specified therefor above.

6. The process of claim 4, wherein E is a radical of the formula

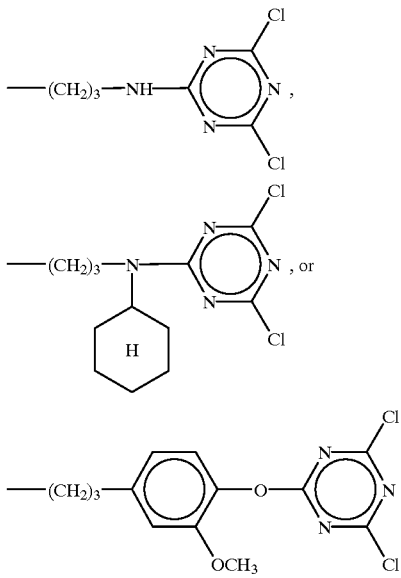

7. The process of claim 4, further comprising equilibrating oxyalkylene-group-containing organosilicon compounds of claim 1 with organopolysiloxanes selected from the group consisting of unbranched terminal-triorganosiloxy group-containing organopolysiloxanes, unbranched terminal-hydroxyl-group-containing organopolysiloxanes, cyclic organopolysiloxanes and mixed polymers of diorganosiloxane and monoorganosiloxane units.

8. The process of claim 7, wherein the linear terminal-triorganosiloxy-group-containing organopolysiloxanes used are those of the formula R$_3$SiO(SiR$_2$O)$_r$SiR$_3$, where R is identical or different, and denotes a monovalent, optionally halogenated hydrocarbon radical having 1–18 carbon atoms, and r is 0 or an integer from 1 to 1500, the linear terminal-hydroxyl-group-containing organopolysiloxanes used are those of the formula HO(SiR$_2$O)$_s$H, where s is an integer from 1 to 1500, the cyclic organopolysiloxanes are those of the formula (R$_2$SiO)$_t$, where t is an integer from 3 to 12, and the mixed polymers are those of units of the formula R$_2$SiO and RSiO$_{3/2}$.

9. A process for treating woven textile fabrics, textile fiber preparations and leather, which comprises applying to said woven textile fabrics, textile fiber preparations, and/or leather, at least one of the oxyalkylene-group-containing organosilicon compounds of claim 1.

10. An organosilicon compound having units of the formula $$E_aR_bSiX_cO_{\frac{4-(a+b+c)}{2}} \quad (IV)$$

where

R is identical or different, and denotes a monovalent optionally halogenated hydrocarbon radical having 1 to 18 carbon atom(s) per radical, X is identical or different and is a chlorine atom or a radical of the formula —OR$^1$, where R$^1$ denotes an alkyl radical having 1 to 18 carbon atom(s) per radical which can be substituted by an ether oxygen atom, a is 0 or 1, b is 0, 1, 2 or 3, and c is 0, 1, 2 or 3 and E is a radical of the formula

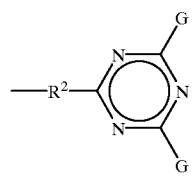

(V)

where R$^2$ is an unbranched or branched optionally substituted divalent hydrocarbon radical having 1 to 18 carbon atom(s), optionally containing ether, amine, sulfide, ester, amide, carbonate, urea and urethane groups, and G denotes a chlorine atom, —OR$^1$, —SR$^1$, —NR$_2^1$ or —O—C(O)R$^1$, with the proviso that at least one chlorine atom is present per polymer molecule.

11. The organosilicon compound of claim 10, prepared by the process which comprises reacting organosilicon compounds containing units of the formula $$D_aR_bX_cSiO_{(4-a-b-c)/2} \quad (VIII),$$

where D is a radical of the formula

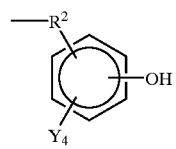

(IX)

with a substituted or unsubstituted cyanuric halide, in the presence of a base.

* * * * *